Figure 1B:
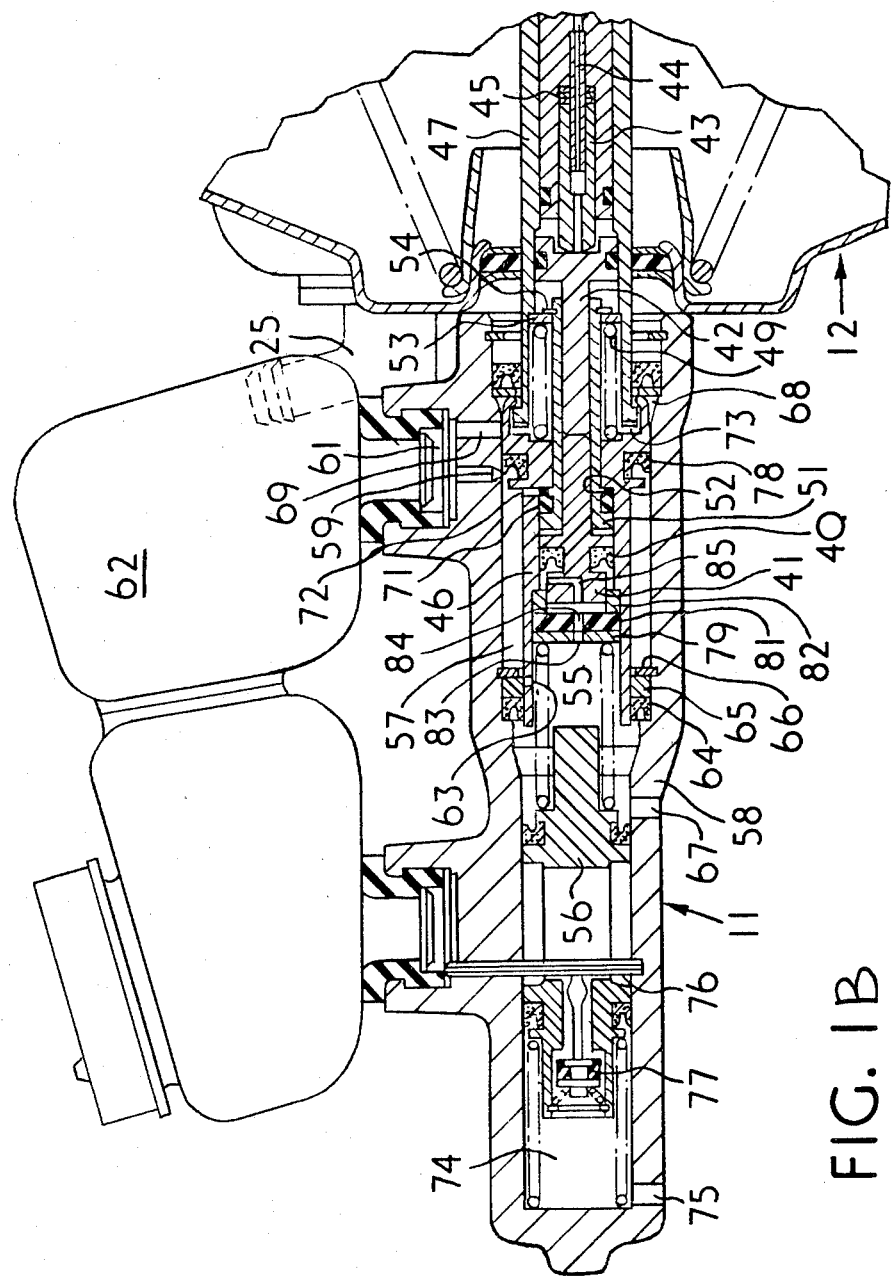

United States Patent [19]

Young

[11] 4,220,007
[45] Sep. 2, 1980

[54] SERVO-ASSISTED HYDRAULIC MASTER CYLINDER

[75] Inventor: Alastair J. Young, Leamington Spa, England

[73] Assignee: Automotive Products Limited, Leamington Spa, England

[21] Appl. No.: 9,084

[22] Filed: Feb. 2, 1979

Related U.S. Application Data

[62] Division of Ser. No. 797,769, May 17, 1977, Pat. No. 4,172,364.

[30] Foreign Application Priority Data

May 19, 1976 [GB] United Kingdom ............... 20569/76
Mar. 19, 1977 [GB] United Kingdom ............... 11753/77

[51] Int. Cl.² ........................................... B60T 13/20
[52] U.S. Cl. ...................................... 60/550; 60/553; 60/567; 60/576; 91/391 R
[58] Field of Search ...................... 60/547 R, 550, 552, 60/553, 554, 567, 574, 576, 577, 578, 581, 588, 591, 592, 593; 91/391 R

[56] References Cited

U.S. PATENT DOCUMENTS

| | | | |
|---|---|---|---|
| 3,062,011 | 11/1962 | Brooks | 60/552 |
| 3,802,199 | 4/1974 | Hagberg, Jr. | 60/574 |
| 3,937,021 | 2/1976 | Sisco | 60/553 |
| 3,972,191 | 8/1976 | Grabb | 60/553 |
| 3,990,241 | 11/1976 | Owens | 60/553 |
| 4,033,131 | 7/1977 | Gardner | 60/553 |

*Primary Examiner*—Abraham Hershkovitz
*Attorney, Agent, or Firm*—Kemon and Estabrook

[57] ABSTRACT

A servo-assisted hydraulic master cylinder has a variable ratio effect so that brake fluid is initially displaced to the brakes at a high rate with respect to driver pedal movement and then at a low rate when an appropriate pressure has developed. A stepped piston assembly comprising a first piston slidable in a second piston defines a first chamber which is directly connected to the brakes and a second chamber in which a variable pressure is developed. The first piston is operated directly by the pedal through the servo valve and is subject only to brake pressure in the first chamber so that brake pressure is proportional to driver effort during normal operation. The second piston is operated by the servo diaphragm through the servo valve housing.

2 Claims, 4 Drawing Figures

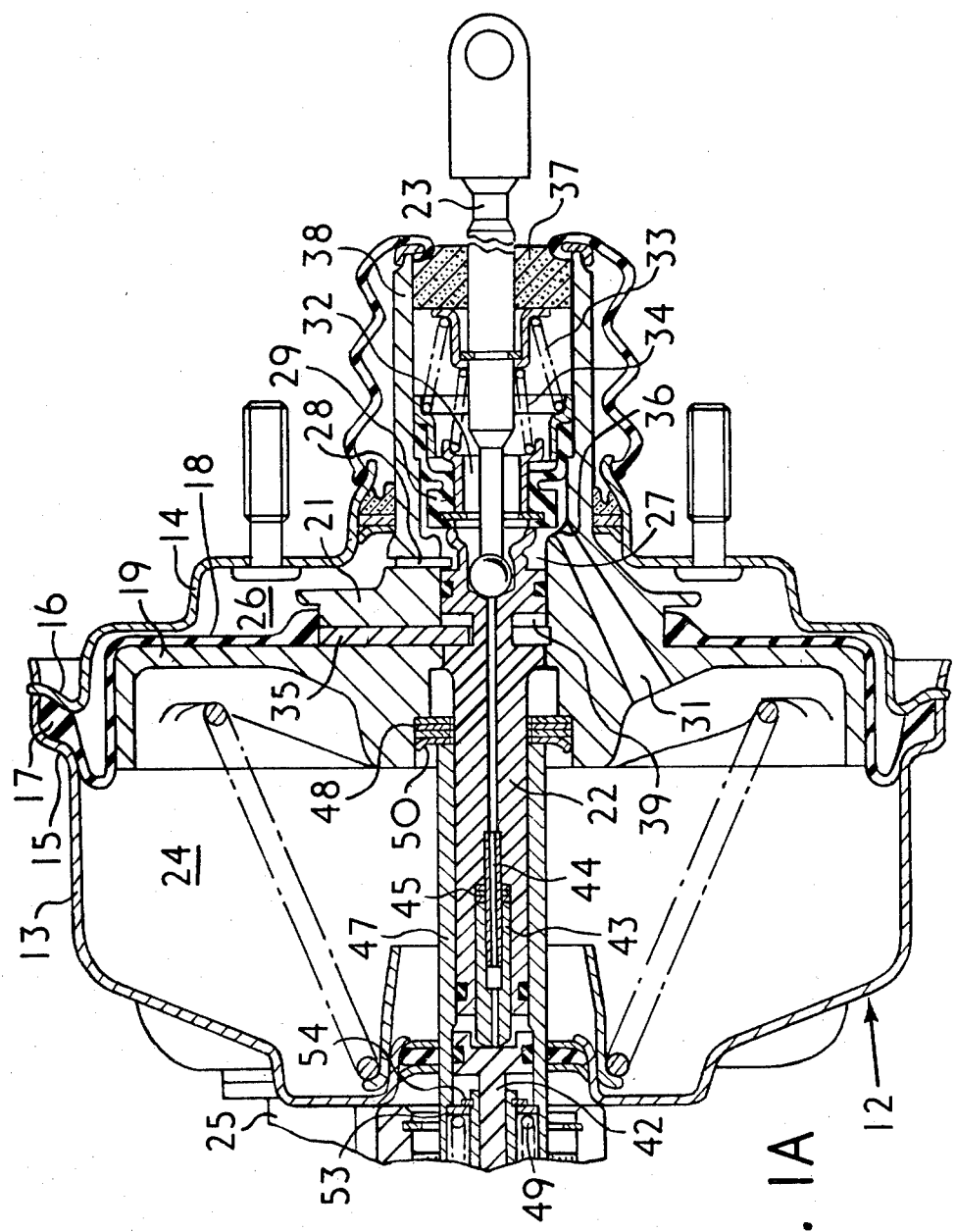
FIG. IA

SERVO-ASSISTED HYDRAULIC MASTER CYLINDER

This is a division of application Ser. No. 797,769, filed May 17, 1977 now U.S. Pat. No. 4,172,364.

The invention relates to servo-assisted hydraulic Master cylinders, particularly, but not exclusively, for vehicle braking systems.

On motor-cars, the most common form of servo-assisted hydraulic master cylinder is that which uses the partial vacuum in the engine inlet manifold as the power source. However, since the pressure difference between the partial vacuum and atmospheric pressure is small, the diaphragm or piston and the associated housing of the servo unit are necessarily large.

One attempt to gain more pressure from a hydraulic master cylinder whilst maintaining a satisfactory brake pedal travel and which dispenses with the servo unit altogether has resulted in the variable ratio master cylinder. This uses a stepped piston and stepped bore to provide a large piston area and a small piston area. Initial movement of the master cylinder piston, which takes up the clearances in the brakes themselves, utilises the large piston area, whereas a greater effort on the piston to apply the brakes hard utilises the small piston area. A valve smooths the transition from the hydraulic ratio obtained with the large piston area to that obtained with the small piston area. These devices have been known for many years, recent examples being shown in British patent specifications Nos. 1,260,680 and 1,372,618. Their commercial success has been very small, probably because they are much more expensive than a normal master cylinder while remaining less effective than a vacuum servo and because the change in hydraulic ratio is noticeable to the driver.

The invention seeks to provide a servo-assisted master cylinder using a relatively small degree of servo assistance by using a master cylinder with a variable ratio effect. For a vacuum servo the invention enables a considerable reduction in the size of the servo casing; for a hydraulic servo the power requirements are reduced so that a closed-centre system can utilise a smaller accumulator and an open-centre system a smaller pump.

U.S. Pat. No. 3,062,011 shows earlier efforts to combine a vacuum servo and a master cylinder with variable ratio. The devices shown fail because the increase of braking pressure with increasing driver effort is discontinuous and because if the vacuum supply fails the master cylinder can utilise the large piston area only.

More recent efforts have concentrated on using the variable ratio effect to disguise from the driver the effect of "vacuum runout", i.e. when the vacuum available is less than the demands of the servo. These are demonstrated by U.S. Pat. Nos. 3,910,046; 3,910,047; 3,911,681 and 3,914,941. Whilst these inventions may help to alleviate a problem of relatively poor manifold vacuum on cars which have certain types of exhaust gas emission control, they would not enable a reduction in servo size on vehicles where vacuum runout is not a serious problem since the consequent change in the reaction ratio (ratio of a servo effort to driver effort) would result in vacuum runout occurring at a much lower braking pressure which would be in the region of normal braking instead of being in the emergency braking region. Variations in the vacuum supply pressure would then be noticeable to the driver as variations in braking effort.

The invention provides a servo-assisted hydraulic master cylinder for a vehicle braking system comprising a movable wall having a servo valve housing operatively connected thereto, a driver-controlled servo valve member in the servo valve housing for controlling a source of relatively high pressure and a source of relatively low pressure to vary a fluid pressure differential across the movable wall, a first piston in the master cylinder adapted to be moved by the servo valve member, a second piston in the master cylinder adapted to be moved by the servo valve housing, a first port in the master cylinder for connection to a tank of hydraulic fluid, a second port in the master cylinder for connection to a vehicle brake actuator, a first chamber in the master cylinder connected to said first and second ports, movement of the servo valve member in a brake applying direction shutting off communication from the first chamber to the first port and causing the first piston to reduce the volume of the first chamber to create a brake-applying pressure at the second port, a second chamber in the master cylinder connected to the first port, movement of the second piston in the brake-applying direction shutting off communication from the second chamber to the first port and varying the volume of the second chamber, first non-return valve means allowing communication from the second chamber to the first chamber, second non-return valve means allowing communication from the first port to the second chamber and a metering valve having a metering valve member which is responsive to pressure in each of said first and second chambers to progressively vary the pressure in the second chamber over a range of pressure in the first chamber, displacement of hydraulic fluid from the first chamber through the second port beginning at a high rate with respect to brake applying movement of the servo valve member and reducing to a low rate when the metering valve becomes operative, the arrangement being such that, while the source pressures are maintained, driver effort on the servo valve member produces a pressure in the first chamber substantially proportional thereto and in the event of failure to maintain the source pressures the change from said high rate of displacement to said low rate occurs at a substantially unaltered pressure in the first chamber.

Preferably, the second piston is concentric with the first piston and the first piston is slidable in the second piston.

The volume of the second chamber may decrease with brake applying movement of the servo valve housing, in which case the metering valve is arranged so that pressure in the first chamber and pressure in the second chamber both act on the metering valve member in opposition to resilient means tending to keep the metering valve member closed, pressure in the second chamber increasing at the same rate as pressure in the first chamber, up to a point when the metering valve becomes operative, hydraulic fluid from the second chamber passing to the first chamber through the first non-return valve means, and thereafter decreasing to tank pressure with progressively increasing pressure in the first chamber, hydraulic fluid from the second chamber passing to the first port through the metering valve. The metering valve member may comprise a plunger slidable in a bore in the first piston against said resilient means, the plunger having an axial bore which is normally closed by a closure member but which is opened by restraining movement of the closure member with the plunger in the direction opposing the loading of said resilient means to allow hydraulic fluid through the said axial bore to said first port. Preferably the plunger has an area exposed to the fluid pressure in said second chamber, fluid pressure in said first chamber acting on the plunger through a thrust member. The fluid pressure in said first chamber may be transmitted to the thrust member through a rubber seal which may also be part of said first non-return valve means.

Alternatively, the volume of the second chamber may increase with brake applying movement of the servo valve housing, in which case the second piston also acts to decrease the volume of the first chamber and the metering valve is arranged so that pressure in the first chamber acts on the metering valve member in opposition to pressure in the second chamber and resilient means both tending to keep the metering valve closed, the arrangement being such that pressure in the second chamber remains at tank pressure by communication through the second non-return valve means up to a point when the metering valve becomes operative to allow controlled communication from the first chamber to the second chamber whereupon the pressure in the second chamber increases with increasing pressure in the first chamber and at a higher rate until becoming equal to the pressure in the first chamber.

Reaction means may be provided to apply to the first piston from the servo valve housing a force proportional to the driver effort applied to the servo valve member. A third piston may be provided to separate the first chamber from a third chamber for supplying another brake actuator in the manner of a tandem master cylinder, in which case other reaction means may be provided between the first, second and third pistons for the first and second pistons to apply a direct force to the third piston in a fixed proportional relationship in the event of a hydraulic failure in the braking system served by said second port.

Figure 2:
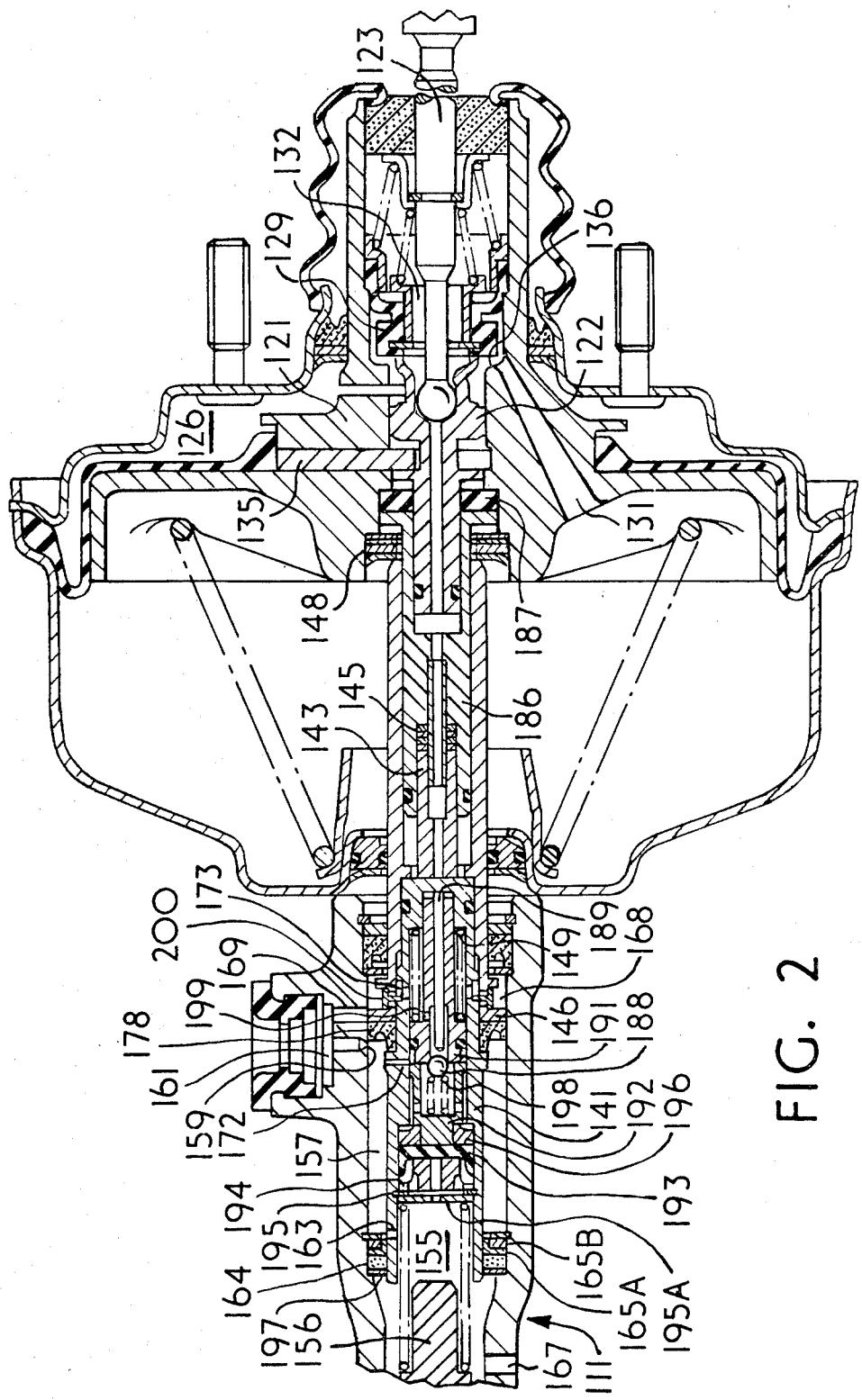
Figure 3:
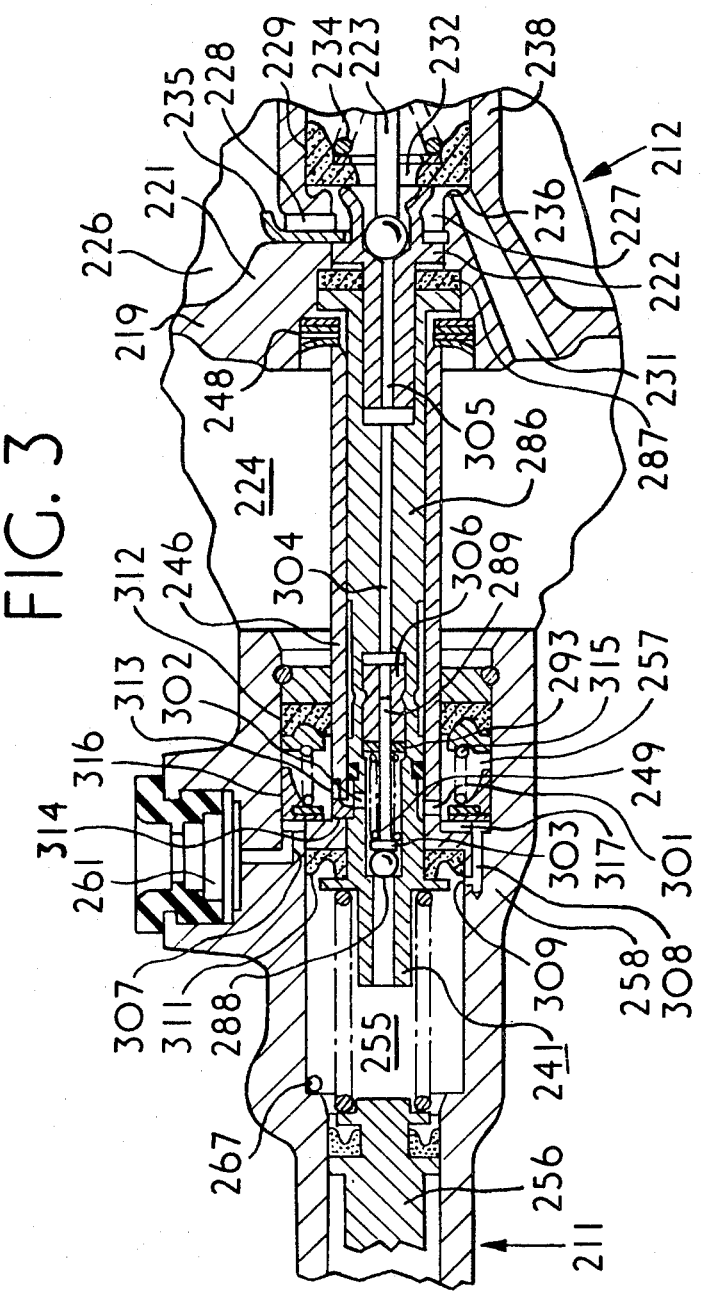

Some embodiments of the invention will now be described by way of example and with reference to the accompanying drawings, in which:

FIGS. 1A and 1B together show a cross-section through one embodiment of a servo-assisted tandem master cylinder according to the invention;

FIG. 2 is a cross-section through a second embodiment of a servo-assisted tandem master cylinder according to the invention, and, FIG. 3 is a cross-section through a third embodiment of a servo-assisted tandem master cylinder according to the invention.

FIGS. 1A and 1B show a master cylinder 11 connected to a vacuum servo unit 12. The servo unit 12 is of mainly conventional form and comprises two cup-shaped metal pressings 13, 14 joined at their respective rims, 15, 16 where they sandwich the outer bead 17 of a diaphragm 18.

The diaphragm 18 is supported by a flange 19 which extends radially outwards as an integral part of a servo valve housing 21. The diaphragm 18 and the diaphragm support flange 19 form a movable wall, a pressure differential across this movable wall being controlled by a servo valve member 22 slidable in an axial stepped bore in the servo valve housing 21 and connected to a push rod 23 for connection to a driver's brake pedal. A chamber 24 within the pressing 13 and on one side of the diaphragm 18 is connected to a source of vacuum, e.g. an engine inlet manifold, through an elbow fitting 25 which includes a non-return valve. Another chamber 26 inside the pressing 14 and on the other side of the diaphragm 18 is connected to an annular chamber 27 encircling the servo valve member 22 by a passage 28 in the servo valve housing 21. The servo valve member 22 co-operates with a rubber valve seat member 29 contained in a tubular extension 38 of the servo valve housing 21 to connect the annular chamber 27 either to vacuum through a passage 31 in the servo valve housing 21 or to atmospheric air through an annular passage 32 between the valve seat member 29 and the push rod 23.

A coil spring 33 biasses the push rod 23 away from the diaphragm support flange 19 and another coil spring 34 biasses the valve seat member 29 in the opposite direction. The initial position of the push rod 23 and the servo valve member 22, as shown in FIG. 1A, is determined by a key 35 fitted into a radial slot in the servo valve housing 21 to project into an annular groove 39 in the servo valve member 22. In this position the annular chamber 27 is connected to the vacuum in chamber 24 through passage 31 and hence the pressures in chambers 24 and 26 are equal. The servo valve member 22 is seated on the valve seat member 29 so that air is prevented from entering through passage 32.

Movement of the push rod 23 in the brake applying direction towards the master cylinder 11 initially moves the servo valve member 22 into a lap position where the valve seat member 29 is still abutting the servo valve member 22 but where it also abuts an annular seat 36 on the servo valve housing 21 to close off the annular chamber 27 to passage 31 as well as to the annular passage 32. Further movement of the push rod 23 towards the master cylinder 11 causes the servo valve member 22 to move away from the valve seat member 29, the valve seat member 29 remaining in abutment with the annular seat 36. Air can now enter chamber 26 through passage 28, annular chamber 27 and annular passage 32. A filter 37 is provided between the push rod 23 and the tubular extension 38 to filter the incoming air.

The master cylinder 11 includes a first piston 41 slidable in a stepped axial bore of a second piston 46 and adapted to be moved by the servo valve member 22 through plungers 42 and 43. Plunger 43 is retained in an axial bore of servo valve member 22 by a roll pin 44 and extends from the servo valve member 22 by an amount adjustable by shims 45. Seal ring 40 seals between the first piston 41 and the bore of the second piston 46.

The second piston 46 is slidable in a stepped bore of the master cylinder body 58 and is adapted to be moved by the servo valve housing 21 through a tubular plunger 47 which contacts an adjustable shim stack 48 held in the stepped bore in the servo valve housing 21 by a sprag washer 50. The connection of the tubular plunger 47 to the second piston 46 is initially through the preload of a coil spring 49 and, after the coil spring 49 has collapsed, by direct contact of the end of tubular plunger 47 with the second piston 46. The coil spring 49 is held against its preload by a tubular valve seat member 51 which has a small flange 52 abutting a step in the axial bore of the second piston 46 and a washer 53 retained by a circlip 54.

A first chamber 55 in the master cylinder 11 is formed between the first piston 41 and a third piston 56 slidable in the master cylinder body 58 and a second chamber 57 is formed between the second piston 46 and the master cylinder body 58. A recuperation port 59 connects the second chamber 57 to a first port 61 for connection to a tank of hydraulic fluid 62. The second chamber 57 is connected through to the first chamber 55 by a port 63, otherwise the second chamber 57 is sealed off from the first chamber 55 by an annular cup seal 64 supported by a backing ring 65 and positioned in the bore of the master cylinder 11 by a circlip 66. The seal 64 is of a type which is common in vehicle braking systems and its properties are such that it acts as a first non-return valve means allowing communication from the second chamber 57 to the first chamber 55. A second port 67 in the master cylinder body 58 opening into chamber 55 is for connection to a vehicle brake actuator.

An annular chamber 68 behind the second piston 46 is connected to the first port 61 through a passage 69 in the master cylinder body 58. Communication between the second chamber 57 and the first port 61 through the annular chamber 68 is controlled by a metering valve, the principle member of which is the second piston 46 itself. The second piston 46 co-operates with a seal 71 carried on the tubular valve seat member 51 so that when the second piston 46 moves relatively towards the tubular plunger 47 against the preload of the coil spring 49, fluid from the second chamber 57 can communicate through a passage 72 in the second piston 46, through a clearance between the bore of the second piston 46 and the valve seat member 51 to the chamber containing the coil spring 49 and out through the clearance between the second piston 46 and the tubular plunger 47 to the annular chamber 68. Grooves 73 in the end face of the tubular plunger 47 ensure a free passage of fluid when the tubular plunger 47 contacts the second piston 46.

The third piston 56 serves to transmit pressure from chamber 55 to a chamber 74 to actuate another brake actuator through a port 75 in the usual manner of a tandem master cylinder secondary piston. The piston 56 is slotted for clearance around a roll pin 76 which serves to limit movement of the piston 56 towards the first piston 41 and also to lift a recuperation valve 77 off a seat formed by the piston 56 at the limit of movement of the piston 56 towards the first piston 41. The roll pin 76 also provides a passage to the tank 62.

The second chamber 57 is sealed from the annular chamber 68 when the second piston 46 is seated on the tubular valve seat member 51 by another annular cup seal 78 which acts as second non-return valve means allowing communication from the first port 61 to the second chamber 57.

Initial movement of the push rod 23 in the brake applying direction, i.e. towards the master cylinder 11, causes the valve seat member 29 to move into the lap position where it abuts the annular seat 36, as previously described. The servo valve housing 21, the tubular plunger 47, the second piston 46 and the tubular valve seat member 51 remain stationary during this movement, whilst plungers 43 and 42 and the first piston 41 move with the servo valve member 22. Further movement of push rod 23 in the brake applying direction causes the servo valve member 22 to move away from the valve seat member 29 and allow a small quantity of air into the chamber 26 to move the servo valve housing 21 towards the master cylinder 11, moving with it the tubular plunger 47 and the second piston 46, which remains spaced from the tubular plunger 47 by the preload of spring 49. Such movement allows the seal 78 to move over the recuperation port 59 to cut off communication between the second chamber 57 and the first port 61. Piston 41 acts to pressurise chamber 55, assisted by the second piston 46 acting directly on chamber 55 by virtue of the annular piston area between the inner diameter of seal 64 and the outer diameter of seal 40. Furthermore, the movement of the second piston 46 causes fluid to be displaced from the second chamber 57 through hole 63 into the chamber 55. Fluid is thus displaced out of port 67 to apply the brakes at a high rate with respect of brake applying movement of the servo valve member 22, the effective piston displacement area being that defined by the outer diameter of seal 78. This rate of fluid displacement continues when slight further movement of the second piston 46 causes the port 63 to be covered by the seal 64 which then prevents communication from the first chamber 55 to the second chamber 57, fluid displaced from the second chamber 57 passing into chamber 55 past the seal 64.

As brake applying pressure at port 67 builds up, both the pressure in chamber 55 and the pressure in chamber 57 act on the second piston 46 to move it against the preload of spring 49. Pressure in the first chamber 55 acts on the annular area of piston 46 defined between the inner diameter of seal 64 and the outer diameter of seal 40 and pressure in chamber 57, which is essentially the same at this stage of operation, acts on the annular area defined between the outer diameter of seal 78 and the inner diameter of seal 64 and also on the small annular area defined between the outer diameter of seal 40 and the valve seat diameter of seal 71. When the pressure in the first chamber 55 and the second chamber 57 is sufficient, the second piston 46 moves relatively towards tubular plunger 47 against the preload of spring 49 to allow a quantity of fluid out of chamber 57 through passage 72 and into chamber 68 to the port 61 and tank 62. The pressure in the second chamber 57 thus drops slightly, so disturbing the force balance on the second piston 46, so that the second piston immediately reseats on the seal 71. Further brake applying movement of push rod 23 increases the pressure in chamber 55 and allows a further small quantity of fluid out of chamber 57 through passage 72. With progressively increasing pressure in chamber 55 the pressure in the second chamber 57 progressively decreases to maintain the force balance on the second piston 46 until the pressure in the second chamber 57 is reduced to the tank pressure. With increasing effort from the servo valve housing 21 the second piston 46 will then abut the tubular plunger 47.

Once the second piston 46 begins its metering valve function and pressure in the second chamber 57 drops below that in the first chamber 55, the effective fluid displacing piston area is that defined by the inner diameter of seal 64.

During brake applying movement of the push rod 23, the servo valve housing 21 moves with the servo valve member 22, except in that some relative movement is necessary to allow air past the valve seat member. The driver's effort on the push rod 23 increases lineally with increasing brake applying pressure in the first chamber 55 by virtue of the direct connection to piston 41, whilst the rate of increase of pressure in the servo chamber 26 changes when the second piston 46 begins its metering valve function and again when the pressure in chamber 57 drops to tank pressure. The effective area of diaphragm 18 and servo valve housing 21 is such that vacuum run-out, when pressure in chamber 26 rises to atmospheric, does not normally take place until after the pressure in the second chamber 57 has dropped to tank pressure. This occurs at a braking pressure of such a high value that it does not occur during normal braking but only during emergencies. The effect of vacuum run-out is no more severe with a servo-assisted master cylinder according to the invention than it is with a conventional master cylinder with vacuum servo assistance, whilst it has been found possible to reduce the effective area of the diaphragm 18 and its support 19 to such an extent that a 25 square inch effective area servo unit will replace a conventional 50 square inch servo unit.

If the vacuum supply fails, movement of the push rod 23 in the brake applying direction causes the servo valve member 22 to move in the servo valve housing 21 towards the master cylinder 11 to the limit allowed by the fit of key 35 in the groove 39. Thereafter manual effort applied to the push rod 23 is transmitted both to the first piston 41 and to the second piston 46, with the second piston 46 performing its metering valve function unaffected by the vacuum failure.

If there is a failure in the braking system connected to port 67 such that no pressure can be developed in the chamber 55, the second piston 46 moves along the bore of the master cylinder 11 until the third piston 56 is contacted by a metal disc 79 carried in the stepped axial bore of the piston 46. This metal disc 79 abuts a rubber reaction disc 81 which in turn abuts a metal ring 82. At the same time the first piston 41 has moved forward relative to the second piston 46 since the servo valve member 22 has moved just beyond the lap position to allow air into chamber 26 and move the servo valve housing 21, so that the clearance between the end face of piston 41 and the rubber reaction disc 81 is much reduced. With continuing movement of the push rod 23 in the brake applying direction, the second piston 46 exerts an effort on the third piston 56 through the metal ring 82, the rubber reaction disc 81 and the metal disc 79 so that the reaction disc 81 tends to extrude back into abutment with the face of piston 41. The rubber reaction disc 81 tends to act as a volume of liquid which is acted on by the adjacent face of metal disc 79 on the one side, and the adjacent annular face of metal ring 82 and the adjacent face of piston 41 on the other side so that the effort applied to the third piston 56 through the metal disc 79 is supplied by the vacuum acting through metal ring 82 and by manual effort applied through piston 41 in proportion to the areas of the faces which adjoin the rubber reaction disc 81. As an alternative, levers may be used in place of the rubber disc 81 to apply to the third piston apportioned efforts from the driver through the first piston and from the servo through the second piston. The levers are arranged radially with respect to the axis of the master cylinder so that the radially inner end of each lever pivots on the first piston, the radially outer end of each lever pivots on the second piston and the third piston pivots on each lever about a fulcrum which is intermediate to the ends and which gives the required ratio of servo effort to driver effort.

The servo-assisted tandem master cylinder shown in FIG. 2 is a modification to that shown in FIGS. 1A and 1B so that only a scrap section is shown. Parts similar or identical to those shown in FIGS. 1A and 1B have the same reference numeral with the addition of 100.

A first piston 141 has a stepped cylindrical surface which is slidable in annular cup seal 164 and in the stepped axial bore of a second piston 146. It is adapted to receive thrust through plunger 143, shims 145 and a plunger 186 from a rubber reaction ring 187. The rubber reaction ring 187 receives forces from the servo valve housing 121 and the servo valve member 122 in proportions equal to the areas of the flat annular faces of the servo valve housing 121 and servo valve member 122 which are adapted to abut the rubber reaction disc 187.

The second piston 146 is adapted to receive a direct thrust from the servo valve housing 121 through the shim stack 148.

The first piston 141 has a blind axial bore which contains a metering valve assembly comprising a metering valve member in the form of a plunger 191 slidable in the bore of piston 141. A valve closure member in the form of a ball 188 is normally seated on an annular seat formed by the open end of an axial stepped bore in the plunger 191.

A pin 189 is slidable in the other, smaller diameter, portion of the bore of the plunger 191 so as to abut the end of the blind bore of the first piston 141. Resilient means comprising a coil spring 149 urges the plunger 191 away from the blind end of the bore in the second piston 141 and into abutment with a thrust member 192 which in turn abuts a rubber cup seal 193. The seal 193 is held in abutment with the end face of the thrust member 192 by a cup spreader 194 retained by circlip 195. A backing collar 196 is a sliding fit over the end of the thrust member 192 which abuts cup seal 193. The resilience of seal 193 is such that pressure in the first chamber is transmitted as a force onto the end face of thrust member 192 as if the thrust member 192 were a piston working in the bore of the backing collar 196.

In this embodiment the cup seal 193 acts as the first non-return valve to allow communication from the second chamber 157 to the first chamber 155 through a radial passage 172 in piston 141, axial grooves in the outer periphery of thrust member 192 and grooves in the outer periphery and rear face of collar 196. Annular cup seal 164 does not act as a non-return valve, being supported on both faces, by a washer 197 on one side and by an L-section backing ring 165A held by circlip 166 and ring 165B on the other side. Annular cup seal 178, being of similar design to the corresponding seal 78 in the FIG. 1 embodiment, is capable of acting as second non-return valve means to allow fluid from the tank to the second chamber 157 but it is supplemented in this embodiment by the ball 188 which is capable of being lifted from its seat on the metering valve plunger 191 against a spring 198.

When the push rod 123 is moved in a brake applying direction towards the master cylinder 111 the valve seat member 129 moves into the lap position where chamber 126 is shut off from passage 131 and annular passage 132 and then remains seated on the annular seat 136 whilst the servo valve member 122 continues to move towards the master cylinder 111 to allow air into the chamber 126. This moves the first piston 141 and the second piston 146 both in the same direction as the brake applying movement of the push rod 123 so that seal 178 wipes over the recuperation port 159 to prevent communication from the second chamber 157 back to the first port 161. With a small further movement of pushrod 123 port 163 wipes over the seal 164 to prevent communication from the first chamber 155 to the second chamber 157. Thus a brake applying pressure is built up in chamber 155, fluid initially being displaced from the second chamber 157 into the first chamber 155 through hole 163 and then being displaced into chamber 155 from the chamber 157 past the cup seal 193 acting as a non-return valve. Fluid is displaced out of the second port 167 to the brake actuator by a piston area equivalent to that defined by the outer diameter of seal 178. The effort applied by the driver through the push rod 123 is that required to resist the brake pressure in chambers 155 and 157 acting on an effective piston area equivalent to that defined by the inner diameter of seal 178, proportionally reduced by the rubber reaction ring 187, which acts in a known manner to proportion the load on plunger 186 between the servo effort from valve housing 121 and the driver's effort from the servo valve member 122.

The rising pressure in chamber 157 acts on the full diameter of metering valve plunger 191 to generate a force which tends to act against the preload of spring 149, this force being supplemented by a small force from spring 198, used to ensure that the ball 188 seats on the plunger. When an appreciable pressure in chamber 157 has developed, the plunger 191 moves against the load of spring 149 until the ball 188 rests on the pin 189, thrust member 192 remaining with its shoulder in abutment with collar 196 by virtue of spring 198. The force tending to move plunger 191 against spring 149 is now that developed by the annular area of plunger 191 outside the seating diameter wih ball 188, and is without the help of spring 198 which is reacted through the ball 188 onto the pin 189. Hence the pressure in chamber 157 continues to rise at the same rate as that in chamber 155 until the pressure is enough to move the plunger 191 a further amount against the load of spring 149 and away from ball 188. This allows a quantity of fluid to flow out of chamber 157, through radial passage 172, through radial holes in the thrust member 192, past the ball 188, into the bore of plunger 191 and out to tank through a radial hole 199 in the plunger 191, the bore space occupied by spring 149, radial holes 173 in the piston 141, corresponding holes in the piston 146, annular chamber 168, passage 169 and port 161. The effective piston area operative to expel fluid from chamber 155 through port 167 to the brakes is now that of the inner diameter of seal 164.

With a small further increase in brake pressure in chamber 155 caused by further brake-applying movement of the pushrod 123, the metering valve plunger 191 acts as a relief valve, keeping the pressure in chamber 157 constant until the brake pressure acting on cup seal 193 is sufficient to move the thrust member 192 against the load of spring 198 and into contact with the plunger 191. With both the pressure in the first chamber 155 and in the second chamber 157 operative to move the plunger 191 against the spring 149, the pressure in the second chamber 157 now progressively reduces as pressure in the first chamber 155 increases, eventually reaching tank pressure when valve plunger 191 moves further against spring 149 to rest against the base of the blind bore in piston 141. A ring 200 has tags which extend through the radial holes in piston 146 into a groove in piston 141 encircling the holes 173 to keep the pistons 141 and 146 together during assembly.

During the period when the plunger 191 is metering, the effort applied by the driver through push rod 123 is that required to resist brake pressure in chamber 155 acting on the piston area defined by the inner diameter of seal 164 less the pressure in chamber 157 acting on an annular piston area equivalent to that defined by the inner diameter of seal 164 less that defined by the inner diameter of seal 178, proportionally reduced by the rubber reaction disc 187. Once the pressure in chamber 157 is reduced to tank pressure the force exerted by the driver on push rod 123 is that required to resist brake pressure in chamber 155 acting on the piston area defined by the inner diameter of seal 164, proportionally reduced by the rubber reaction ring 187. Although there are changes in the proportional effort exerted by the driver between the three phases of operation, i.e. before metering begins, during metering and after metering, the changes are very slight and are not noticed by the driver.

As with the previous embodiment, vacuum runout does not normally occur until after the pressure in chamber 157 has dropped to tank pressure. If the vacuum supply fails, the servo valve member 122 contacts the key 135 to apply a manual thrust through the servo valve housing 121 onto the second piston 146 as well as applying a direct thrust to the first piston 141 through the plungers 143 and 186 and the rubber reaction disc 187. The metering valve operates as described above so that the rate of displacement of fluid through to the brakes through port 167 with movement of the push rod 123 is unaffected by the vacuum failure.

In the event of a hydraulic line failure to the brake actuator served by port 167, a disc 195A contacts the third piston 156, servo effort and manual effort being applied in proportions fixed by the reaction ring 187.

In a modification, the thrust member 192 is firmly attached to the metering valve plunger 191 or is integral therewith. The metering valve works substantially in the manner described above, except that there is no intermediate operating phase during which the pressure in chamber 157 remains constant for increasing pressure in chamber 155 as fluid is relieved to tank past the ball 198. Instead, the increasing pressure in chamber 155 is effective to decrease pressure in chamber 157 as soon as the valve starts to open.

FIG. 3 shows a further modification to the servo-assisted master cylinder shown in FIGS. 1A and 1B. Where appropriate, parts which are similar to those shown in FIGS. 1A and 1B have 200 added to their reference numeral.

A first piston 241 is adapted to be moved by the servo valve member 222 to pressurise fluid in a first chamber 255 when the driver controlled push rod 223 is moved in a brake applying direction towards the master cylinder 211 through a plunger 286 which receives a force from a rubber reaction ring 287. The rubber reaction ring 287 acts in a known manner to apportion the load on plunger 286 between the servo valve member 22 and the servo valve housing 221 in proportion to the areas of the servo valve member 222 and the servo valve housing 221 with which it is adapted to abut. A second stepped piston 246 is slidable over the first piston 241 and plunger 286 and is adapted to be moved by a direct force from the servo valve housing 221 acting through shim stack 248. The volume of a second chamber 257 increases with movement of the second piston 246 caused by brake applying movement of the servo valve housing 221, the second piston 246 also acting to decrease the volume of the first chamber 255.

A metering valve in an axial bore of the first piston 241 comprises a metering valve member in the form of a ball 288 arranged so that pressure in the first chamber 255 acts on the ball 288 in opposition to pressure in the second chamber 257 acting through passage 301 in the second piston 246 and passage 302 in the first piston 241 and against the preload of coil spring 249, both tending to keep the metering valve ball 288 seated. A metering valve pin 289, slidable in an axial bore of a plug 306 held in the bore of piston 241 has a head 303 which reacts the force of the coil spring 249 and a sealing washer 293 which seals the shank so that sufficient pressure in the second chamber 283 can act on the pin 289 to over come the preload of spring 249. Passages 304, 305 in the plunger 286 and valve member 222 respectively vent the axial bore of the plug 306. The plug 306 is retained in the axial bore of the first piston 241 by radially crimping the first piston 241.

A recuperation valve ring 316 slidable in the bore of the master cylinder 211 is unseated from a port 307 and a port 308 by the second piston 246 when the input push rod 223, servo valve member 222 and servo valve housing 221 are in the brake released position. The port 307 communicates with the port 261 connected to the fluid tank and the port 308 is connected to a port 309 in the bore of the master cylinder. A groove 317 in the second piston 246 allows communication from the second chamber 257 to ports 307, 308 when valve ring 316 is unseated.

When the driver applies a brake applying force to the push rod 223 to move it towards the master cylinder 211, the valve seat member 229 is moved along the bore of the tubular extension 238 until it seats on the annular seat 236. Valve member 222 continues to move forward to allow air into chamber 226 through annular passage 232, annular chamber 277 and passage 228. This design differs from the previous two embodiments in that the key 235 is positioned in the passage 228 and provides a stop for the servo valve member 222 in one direction only.

The first piston 241 is moved towards the third piston 256 by the plunger 286 and the rubber reaction ring 287, and the second piston 246 is moved by the servo valve housing 221 acting through the shim stack 248. In moving forward towards the third piston 256, the second piston 246 allows the recuperation valve ring 316 to move forward under the bias of a spring 315 and block ports 308 and 307 and at the same time an annular cup seal 311 wipes over port 309 so that communication from the first chamber 255 to the second chamber 257 is prevented. With continuing brake applying effort and travel to the push rod 223, the brake pressure builds up in chamber 255 and is directed to a brake actuator through port 267. Fluid is displaced out of port 267 by an effective piston area defined by the outer diameter of seal 311 whilst fluid from the tank is drawn into the second chamber 257 through port 261 and port 307 by virtue of recuperation valve disc 316 acting as a non-return valve.

When sufficient pressure is built up in chamber 255 it acts on the metering valve ball 288 to lift it from its seat in the first piston 241 and allows a quantity of fluid from the first chamber 255 to the second chamber 257. This immediately raises the pressure in the second chamber 257, lowering the pressure difference across the metering valve ball 288 and causing it to reseat. With increasing brake applying movement of the push rod 223 the brake pressure in the first chamber 255 continues to increase, causing the metering valve ball 288 to open and close to progressively increase the pressure in the second chamber 257. The diameter of the seat in piston 241 for the metering valve ball 288 and the diameter of the pin 289 are such that, during this phase of operation, pressure in the second chamber 257 increases more rapidly than pressure in the first chamber 255, until it reaches the point where it equals the brake pressure in the first chamber 255, whereupon the metering valve ball 288 opens fully. From the point where the metering valve ball 288 starts to function fluid is displaced from chamber 255 out through port 267 by an effective piston area defined by the inner diameter of a seal 312 which seals the smaller outer diameter of piston 246. During the first phase of operation, before the metering valve starts to operate, during the second phase of operation, when the metering valve is operating, and during the third phase of operation, when the metering valve is fully open, the first piston 241 transmits back to the push rod 223 a forcce equivalent to the brake pressure acting on the inner diameter of seal 311 acting through plunger 286 and proportionally reduced by the rubber reaction disc 287.

During return movement of the first piston 241 and the second piston 246, the seal 311 acts as a first non-return valve allowing communication from the second chamber 293 to the first chamber 255 until the recuperation valve ring 316 acting as a second non-return valve during forward motion of the first piston 241 is lifted by the second piston 246. A ring 313 has tabs 314 which extend into the passages 301 in the second piston 246 into an annular groove in the first piston 241 to retain the first and second pistons together as an assembly.

If the vacuum fails, the driver's effort from push rod 223 is applied to piston 241 through the plunger 286, reaction ring 287 and servo valve member 222 and to the piston 246 through the shim stack 248 and the flanged end of plunger 286. The metering valve operates as described above so that the rate of displacement of fluid to the brakes through port 267 is unaffected by the vacuum failure.

Failure in the brake lines connected to the port 267 causes the first piston 241 to contact the third piston 256 and the rubber reaction disc 287 then proportions driver effort through the servo valve member 222 and servo effort through the servo valve housing 221.

I claim:

1. A servo-assisted hydraulic master cylinder for a vehicle braking system comprising a movable wall having a servo valve housing operatively connected thereto, a driver-controlled servo valve member in the servo valve housing for controlling a source of relatively high pressure and a source of relatively low pressure to vary a fluid pressure differential across the movable wall, a first piston in the master cylinder adapted to be moved by the servo valve member, a second piston in the master cylinder adapted to be moved by the servo valve housing, a first port in the master cylinder for connection to a tank of hydraulic fluid, a second port in the master cylinder for connection to a vehicle brake actuator, a first chamber in the master cylinder connected to said first and second ports, movement of the servo valve member in a brake-applying direction shutting off communication from the first chamber to the first port and causing the first piston to reduce the volume of the first chamber to create a brake-applying pressure at the second port, a second chamber in the master cylinder connected to the first port, movement of the second piston in the brake-applying direction shutting off communication from the second chamber to the first port and increasing the volume of the second chamber, first non-return valve means allowing communication from the second chamber to the first chamber, second non-return valve means allowing communication from the first port to the second chamber and a metering valve having a metering valve member which is responsive to pressure in each of said first and second chambers to progressively increase the pressure in the second chamber over a range of pressure in the first chamber, said first and second pistons together defining a large piston area by which hydraulic fluid is displaced from the first chamber through the second port at a high rate with respect to brake-applying movement of the servo valve member and a small piston area by which hydraulic fluid is displaced from the first chamber through the second port at a low rate when the metering valve becomes operative, the metering valve including an area on the metering valve member which is acted on by the force of pressure in the first chamber, another area on the metering valve member which is acted on by pressure in the second chamber to reduce said force and a preloaded spring acting between the metering valve member and one of said first and second pistons, said force moving the metering valve member against the preloaded spring to open the metering valve and increase the pressure in the second chamber and the resultant increase in the pressure in the second chamber reducing said force to allow the preloaded spring to close the metering valve, the master cylinder also comprising an operative connection between the servo valve member and the first piston providing a force reaction of pressure in the first chamber onto the servo valve member such that the effort required by the driver increases in direct proportion to the pressure in the first chamber and abutment means establishing a direct mechanical connection between the servo valve member and the servo valve housing in the event of a failure to maintain the source pressures to move both the first piston and the secnd piston in the brake-applying direction, the abutment means allowing normal operation of the metering valve member so that the metering valve continues to function normally, the volume of the second chamber increases with brake-applying movement of the servo valve housing, the second piston also acting to decrease the volume of the first chamber and the metering valve being arranged so that pressure in the first chamber acts on the metering valve member in opposition to pressure in the second chamber and resilient means both tending to keep the control valve seated, the arrangement being such that pressure in the second chamber remains at tank pressure by communication through the second non-return valve means up to a point when the metering valve becomes operative to allow controlled communication from the first chamber to the second chamber whereupon the pressure in the second chamber increases with increasing pressure in the first chamber and at a higher rate until becoming equal to the pressure in the first chamber.

2. The master cylinder of claim 1 wherein said second non-return valve means comprises a spring loaded ring which is unseated by the second piston when in the brake released position.

* * * * *